US012191067B2

(12) United States Patent
Araki et al.

(10) Patent No.: US 12,191,067 B2
(45) Date of Patent: Jan. 7, 2025

(54) COIL COMPONENT

(71) Applicant: Murata Manufacturing Co., Ltd., Kyoto-fu (JP)

(72) Inventors: Kenichi Araki, Nagaokakyo (JP); Keiichi Ishida, Nagaokakyo (JP); Yutaka Noguchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 492 days.

(21) Appl. No.: 16/935,133

(22) Filed: Jul. 21, 2020

(65) Prior Publication Data

US 2021/0098181 A1 Apr. 1, 2021

(30) Foreign Application Priority Data

Sep. 30, 2019 (JP) ................................ 2019-180256

(51) Int. Cl.

*H01F 27/28* (2006.01)
*H01F 27/24* (2006.01)
*H01F 27/255* (2006.01)
*H01F 27/29* (2006.01)
*H01F 27/32* (2006.01)
*H01F 41/02* (2006.01)
*H01F 41/04* (2006.01)

(52) U.S. Cl.

CPC ....... *H01F 27/2804* (2013.01); *H01F 27/255* (2013.01); *H01F 27/29* (2013.01); *H01F 41/0206* (2013.01); *H01F 41/043* (2013.01); *H01F 2027/2809* (2013.01)

(58) Field of Classification Search

CPC .. H01F 2017/048; H01F 17/04; H01F 27/292; H01F 27/255; H01F 17/0013; H01F 2003/106; H01F 27/2804; H01F 2017/0066; H01F 27/22; H01F 3/10; H01F 1/26; H01F 2017/002; H01F 3/08; H01F 27/29; H01F 41/0206; H01F 41/043; H01F 2027/2809

See application file for complete search history.

(56) References Cited

U.S. PATENT DOCUMENTS 1,634,923 A * 7/1927 Thullen .................. H01F 19/02 336/107
2,283,924 A * 5/1942 Harvey .................. H01F 21/06 336/87
3,403,366 A * 9/1968 Klatte .................... H01F 27/02 336/107

(Continued)

FOREIGN PATENT DOCUMENTS

CN 109935450 A * 6/2019 ......... H01F 17/0013
JP H04-346204 A 12/1992

(Continued)

*Primary Examiner* — Mang Tin Bik Lian
(74) *Attorney, Agent, or Firm* — Studebaker & Brackett PC

(57) ABSTRACT

A coil component including a substantially rectangular parallelepiped first magnetic portion that includes a coil conductor and a second magnetic portion disposed on at least the upper surface of the first magnetic portion. The first magnetic portion contains first magnetic particles including a metal magnetic material, the second magnetic portion contains second magnetic particles and a resin, and the resin content in the second magnetic portion is higher than the resin content in the first magnetic portion.

19 Claims, 5 Drawing Sheets

(56) References Cited

U.S. PATENT DOCUMENTS

| | | | | |
|---|---|---|---|---|
| 8,723,629 | B1 * | 5/2014 | Liu | H01F 1/14791 336/212 |
| 11,087,917 | B2 * | 8/2021 | Sato | H01F 27/2823 |
| 11,837,394 | B2 * | 12/2023 | Kim | H01F 41/061 |
| 2014/0176286 | A1 * | 6/2014 | Okada | H01F 17/0013 336/200 |
| 2014/0184374 | A1 * | 7/2014 | Park | H01F 17/0013 336/83 |
| 2017/0133143 | A1 * | 5/2017 | Maeda | H01F 41/0246 |
| 2018/0166199 | A1 | 6/2018 | Hachiya et al. | |
| 2018/0308609 | A1 * | 10/2018 | Shinohara | H01F 1/26 |
| 2018/0308620 | A1 * | 10/2018 | Shinohara | H01F 27/2823 |
| 2019/0074125 | A1 * | 3/2019 | Yoshioka | H01F 27/29 |
| 2019/0096566 | A1 * | 3/2019 | Odahara | H01F 27/292 |
| 2019/0221357 | A1 * | 7/2019 | Sugiyama | H01F 27/292 |
| 2019/0252111 | A1 * | 8/2019 | Matsui | H01F 27/29 |
| 2019/0279801 | A1 * | 9/2019 | Yoshidome | H01F 3/08 |
| 2019/0304659 | A1 * | 10/2019 | Tonogai | H01F 27/2823 |
| 2020/0312498 | A1 * | 10/2020 | Takadate | H01F 27/32 |
| 2020/0328021 | A1 * | 10/2020 | Yamashita | H01F 27/255 |
| 2021/0159009 | A1 * | 5/2021 | Yoshikawa | H01F 37/00 |
| 2021/0159011 | A1 * | 5/2021 | Misaki | H01F 41/0246 |
| 2021/0391115 | A1 * | 12/2021 | Inaba | H01F 27/324 |
| 2022/0059266 | A1 * | 2/2022 | Saito | H01F 41/041 |
| 2022/0115175 | A1 * | 4/2022 | Misaki | H01F 27/2823 |

FOREIGN PATENT DOCUMENTS

| | | | | |
|---|---|---|---|---|
| JP | 2017-199734 A | | 11/2017 | |
| JP | 2018-160611 A | | 10/2018 | |
| JP | 2019-125689 A | | 7/2019 | |
| WO | WO-2019102726 A1 | * | 5/2019 | H01F 17/04 |

* cited by examiner

COIL COMPONENT

CROSS-REFERENCE TO RELATED APPLICATION

This application claims benefit of priority to Japanese Patent Application No. 2019-180256, filed Sep. 30, 2019, the entire content of which is incorporated herein by reference.

BACKGROUND

Technical Field

The present disclosure relates to a coil component.

Background Art

To date, a sintered body of metal magnetic particles has been used as a magnetic material constituting electronic components, for example, coil components.

Japanese Unexamined Patent Application Publication No. 4-346204 discloses a composite material having a structure in which particles of substance A are in substantially no contact with each other due to the surface of substance A that is a particulate metal or alloy being substantially covered with a coating film of substance B with higher electrical resistance than substance A, wherein the ratio of each particle diameter of substance A to the average particle diameter is substantially within the range of 0.8 to 1.2 and the relative density is 97% or more. Japanese Unexamined Patent Application Publication No. 4-346204 discloses that a high-electrical-resistance composite sintered body with a thin insulating layer is obtained by adopting the specified configuration of the composite material.

SUMMARY

The characteristics required of a coil component include excellent moisture resistance.

Accordingly, the present disclosure provides a coil component having high moisture resistance.

The present inventors performed repeated research. As a result, it was found that, regarding a coil component including a first magnetic portion containing metal magnetic particles and a second magnetic portion that is disposed on at least the upper surface of the first magnetic portion and that contains magnetic particles and a resin, setting the resin content in the second magnetic portion to be higher than the resin content in the first magnetic portion enables the coil component having high moisture resistance to be obtained, and the present disclosure was realized.

According to preferred embodiments of the present disclosure, there is provided a coil component including a substantially rectangular parallelepiped first magnetic portion that includes a coil conductor and a second magnetic portion disposed on at least the upper surface of the first magnetic portion. The first magnetic portion contains first magnetic particles including a metal magnetic material, the second magnetic portion contains second magnetic particles and a resin, and the resin content in the second magnetic portion is higher than the resin content in the first magnetic portion.

Other features, elements, characteristics, and advantages of the present disclosure will become more apparent from the following detailed description of preferred embodiments of the present disclosure with reference to the attached drawings.

DETAILED DESCRIPTION

The embodiments according to the present disclosure will be described below in detail with reference to the drawings. However, the embodiments below are described for the purpose of exemplification, and the present disclosure is not limited to the following embodiments.

Various numerical ranges mentioned in the present specification are intended to include the lower limit value and the upper limit value. These numerical values are included in the case in which the term “or more” or “or less” is attached, as a matter of course, and even when such a term is not attached unless otherwise specified. For example, a numerical range of “1 to 10” is assumed to include the lower limit value of “1” and the upper limit value of “10”.

First Embodiment

Figure 1:
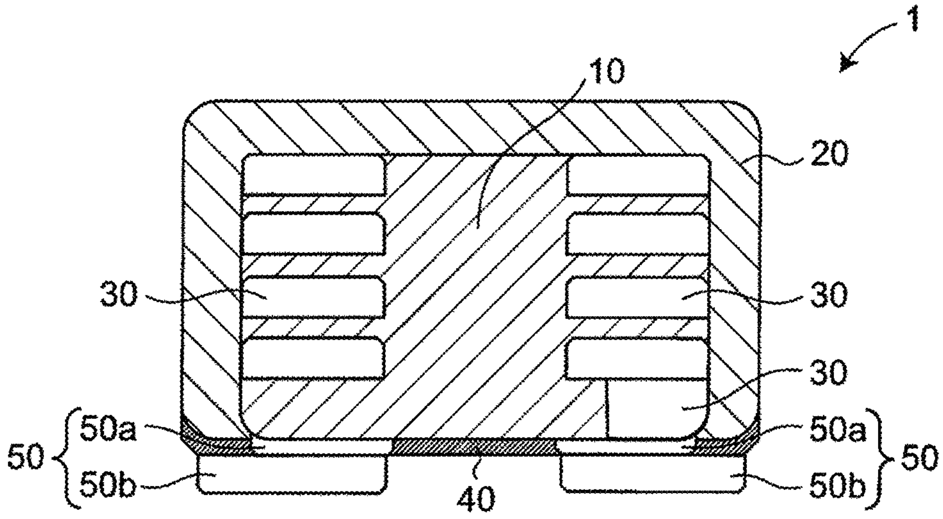
FIG. 1 is a schematic sectional view of a coil component according to a first embodiment of the present disclosure.
Figure 4:
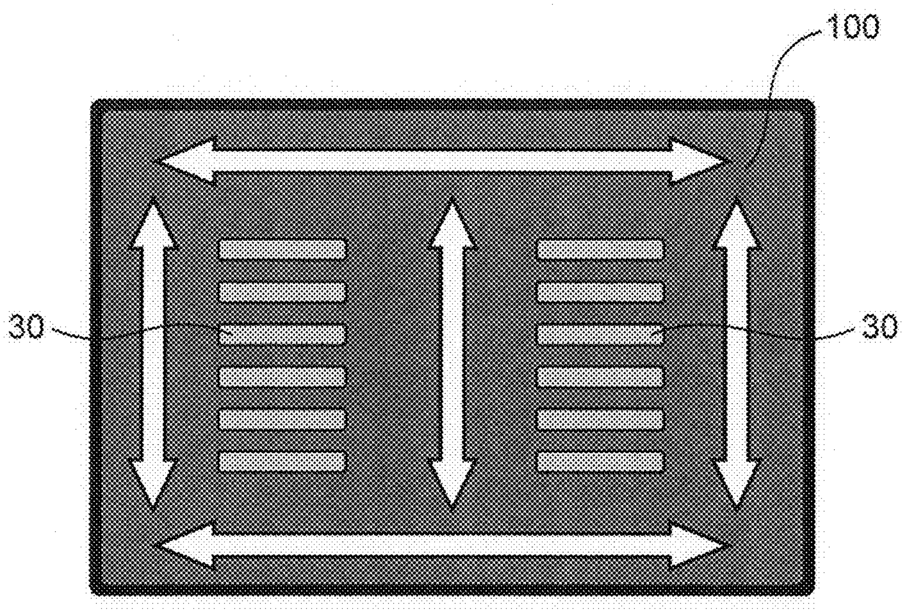
FIG. 4 is a schematic diagram showing the directions of magnetic fields generated in a coil component.

FIG. 1 is a schematic sectional view of a coil component 1 according to a first embodiment of the present disclosure. The coil component 1 according to the first embodiment includes a substantially rectangular parallelepiped first magnetic portion 10 that includes a coil conductor 30 and a second magnetic portion 20 disposed on at least the upper surface of the first magnetic portion 10. In this regard, in the present specification, “rectangular parallelepiped” includes a cube. In the present specification, “substantially rectangular parallelepiped” includes a rectangular parallelepiped in which at least one corner portion or ridge portion is rounded. In addition, a shape in which a region containing at least part of the ridge portion is not present is included in “substantially rectangular parallelepiped”. In the present specification, the first magnetic portion 10 and the second magnetic portion 20 may be collectively referred to as "magnetic portion" (indicated by reference 100 in FIG. 4).

The first magnetic portion 10 contains first magnetic particles including a metal magnetic material. As described later, the first magnetic portion 10 may further contain a resin. The second magnetic portion 20 contains second magnetic particles and a resin. As described later, the second magnetic portion 20 may further contain third magnetic particles, and the first magnetic portion 10 may further contain fourth magnetic particles.

The resin content in the second magnetic portion 20 is higher than the resin content in the first magnetic portion 10. That is, in the coil component 1 according to the present embodiment, at least one surface of the first magnetic portion 10 having a relatively low resin content is covered with the second magnetic portion 20 having a relatively high resin content. The coil component 1 according to the present embodiment has such a configuration and, thereby, has high moisture resistance as described below in detail.

Since the second magnetic portion 20 has a higher resin content than the first magnetic portion 10, the amount of voids that may be present inside the second magnetic portion 20 is less than the amount of voids that may be present inside the first magnetic portion 10. In the coil component 1 according to the present embodiment, at least the upper surface of the first magnetic portion 10 in which a relatively large amount of voids are present is covered with the second magnetic portion 20 in which a relatively small amount of voids are present. That is, at least the upper surface of the outer surfaces of the magnetic portion is composed of the second magnetic portion 20 in which a relatively small amount of voids are present. Consequently, the amount of voids in the vicinity of the outer surface of the magnetic portion can be reduced. As a result, moisture may be suppressed from entering the magnetic portion through voids, and the moisture resistance of the coil component 1 may be improved.

On the other hand, in the case in which the magnetic portion is composed of only a sintered body obtained by firing magnetic particles at high temperature, although the filling ratio of the magnetic particles with respect to the magnetic portion is increased, voids are formed between magnetic particles during firing, and, as a result, a relatively large amount of voids may be present in the vicinity of the outer surface of the magnetic portion. In the case in which a relatively large amount of voids are present in the vicinity of the outer surface of the magnetic portion, moisture may enter the magnetic portion through the voids. Consequently, a problem of deterioration of the moisture resistance of the coil component occurs. Meanwhile, regarding the coil component 1 according to the present embodiment, even in the case in which the first magnetic portion 10 has a relatively large amount of voids, moisture may be suppressed from entering the magnetic portion through voids since the second magnetic portion 20 is disposed on at least the upper surface of the first magnetic portion 10. As a result, the moisture resistance of the coil component 1 may be improved.

In addition, in the coil component 1 according to the present embodiment, since the amount of voids in the vicinity of the outer surface of the magnetic portion is reduced as described above, a plating solution is suppressed from entering the magnetic portion through voids during plating treatment described later. Consequently, deterioration in voltage resistance and occurrence of a short-circuit defect caused by entry of a plating solution may be suppressed so as to improve the voltage resistance of the coil component 1. Further, plating may also be suppressed from bleeding.

On the other hand, in the case in which the magnetic portion is composed of only a sintered body obtained by firing magnetic particles at high temperature, a large amount of voids may be present in the vicinity of the outer surface of the magnetic portion, as described above. In the case in which a large amount of voids are present in the vicinity of the outer surface of the magnetic portion, a plating solution may enter the magnetic portion through the voids and, as a result, the voltage resistance of the coil component may deteriorate. Meanwhile, regarding the coil component 1 according to the present embodiment, even in the case in which the first magnetic portion 10 has a relatively large amount of voids, a plating solution may be suppressed from entering the magnetic portion through voids since the second magnetic portion 20 is disposed on at least the upper surface of the first magnetic portion 10. As a result, the voltage resistance of the coil component 1 may be improved.

The coil component 1 according to the present embodiment may have excellent magnetic characteristics. In the coil component 1 according to the present embodiment, the first magnetic portion 10 has a lower resin content than the second magnetic portion 20 and, therefore, may be filled with the first magnetic particles at high density. Such a first magnetic portion 10 being included enables the magnetic permeability of the first magnetic portion 10 and the entire magnetic portion to be improved. The amount of voids may be evaluated in accordance with porosity described later. Preferably, the first magnetic portion 10 contains substantially no resin. In the case in which the first magnetic portion 10 contains substantially no resin, the first magnetic portion 10 may be filled with the first magnetic particles at higher density, and, as a result, the magnetic permeability of the first magnetic portion 10 and the entire magnetic portion may be further improved.

Further, the magnetic permeability of magnetic particles may deteriorate due to heat treatment at high temperature (a high temperature of, for example, about 600° C.) in accordance with the type (composition) of a material. In the case in which a magnetic portion is formed by heat-treating magnetic particles composed of such a material at high temperature, the direct current superposition characteristics of the resulting coil component 1 may deteriorate. On the other hand, the second magnetic portion 20 has a relatively high resin content and, therefore, can be formed without performing heat treatment (firing) at high temperature. For example, the second magnetic portion 20 may be formed by curing the resin. Consequently, regarding the second magnetic particles contained in the second magnetic portion 20, particles of a material having magnetic permeability that readily deteriorates due to heat, for example, a material having a high saturation magnetic flux density (Bs) such as pure iron and/or a nanocrystalline material, may be used. As described above, the second magnetic portion 20 can be formed at significantly lower temperature than common firing temperatures. Therefore, even in the case in which a material having magnetic permeability that readily deteriorates due to heat is used, the magnetic permeability of the second magnetic particles may be suppressed from deteriorating. As described above, the second magnetic portion 20 may forgo high-temperature firing that may cause deterioration of the magnetic permeability. Therefore, various materials can be appropriately selected as the second magnetic particles contained in the second magnetic portion 20 in accordance with the predetermined characteristics (magnetic characteristics and the like). Consequently, the characteristics of the coil component 1 may be readily adjusted, and the coil component 1 having excellent characteristics (direct current superposition characteristics) is realized.

Regarding the coil component 1 according to the present embodiment, the moisture resistance and the voltage resistance are improved by molding a core outer-circumference portion (second magnetic portion 20) having a relatively high resin content to the first magnetic portion 10 corresponding to a core portion. Such a technique may reduce the time required for production and may reduce the cost compared with, for example, a technique to improve the moisture resistance and the voltage resistance by impregnating the core portion with a resin.

Method for Measuring Resin Content

The resin content in each of the first magnetic portion 10 and the second magnetic portion 20 may be measured by the method described below. The coil component 1 is cut so as to form a cross section. The position and the direction of cutting is appropriately set so that both the first magnetic portion 10 and the second magnetic portion 20 are exposed at the cross section. For example, as described later, in the case in which the coil component 1 is provided with outer electrodes 50 on the bottom surface, the coil component 1 is cut in the direction perpendicular to the bottom surface so as to form a cross section perpendicular to the bottom surface. The resulting cross section is processed by ion milling. The processed cross section of each of the first magnetic portion 10 and the second magnetic portion 20 is subjected to time-of-flight secondary ion mass spectrometry (TOF-SIMS), X-ray photoelectron spectroscopy (XPS), or energy dispersive X-ray analysis (EDX). According to analysis of the cross section of the coil component 1, in the region in which the resin is present, carbon (C) resulting from the composition of the resin component is detected, whereas the region in which no resin is present hardly contains C. Therefore, in the cross section of the coil component 1, the resin content may be calculated on the basis of the area of the region in which C is detected.

Each element constituting the coil component 1 according to the present embodiment will be described below in detail.

First Magnetic Portion 10

In the coil component 1, the first magnetic portion 10 is disposed in the magnetic core portion of a coil conductor 30. The first magnetic portion 10 contains first magnetic particles including a metal magnetic material. The first magnetic portion 10 may further contain a resin. In the case in which the first magnetic portion 10 contains a resin, there is no particular limitation regarding the type of the resin, and the resin may be appropriately selected in accordance with the predetermined characteristics. The first magnetic portion 10 may contain at least one resin selected from a group consisting of, for example, epoxy-based resins, phenol resins, polyester resins, polyimide resins, polyolefin resins, Si-based resins, acrylic resins, polyvinyl butyral resins, cellulose resins, and alkyd resins. In the case in which the first magnetic portion 10 contains the resin, it is preferable that the molecular weight of the resin contained in the first magnetic portion 10 be greater than the molecular weight of the resin contained in the second magnetic portion 20.

First Magnetic Particles

The metal magnetic material constituting the first magnetic particles may be, for example, pure iron (Fe) or an alloy thereof (FeSi, FeAl, FeSiCr, and the like). Preferably, the first magnetic particles are composed of FeSi. Using FeSi as the material for constituting the first magnetic particles enables the magnetic characteristics of the coil component 1 to be further improved.

The first magnetic portion 10 may contain a promoter to facilitate oxide film formation of the first magnetic particles. The promoter may contain, for example, zinc (Zn) and/or lithium (Li). In the case in which the promoter contains zinc, zinc serves as nuclei for oxide film formation, and, as described later, during firing the first magnetic particles, formation of an oxide film on each of the first magnetic particle surfaces and bonding between oxide films (bonding between the first magnetic particles with the oxide film interposed therebetween) may be facilitated. In the case in which the first magnetic particle contains zinc, the oxide film of the first magnetic particle may contain zinc oxide.

The average particle diameter of the first magnetic particles is preferably about 1 μm or more and 50 μm or less (i.e., from about 1 μm to 50 μm), more preferably about 1 μm or more and 30 μm or less (i.e., from about 1 μm to 30 μm), and further preferably about 3 μm or more and 20 μm or less (i.e., from about 3 μm to 20 μm). The average particle diameter of the first magnetic particles may be measured by the method described below. A cross section of the coil component 1 is formed and is processed by ion milling by applying the same technique as the technique described in measuring the resin content above. The processed cross section is observed by using a scanning electron microscope (SEM). The magnification of the SEM is set to be preferably about 500 times or more and 5,000 times or less (i.e., from about 500 times to 5,000 times). Particle diameters (equivalent circle diameters) of the first magnetic particles in the resulting SEM image are measured, and the average value of 100 or more first magnetic particles is taken as the average particle diameter of the first magnetic particles. In this regard, the average particle diameter of each of the second magnetic particles, the third magnetic particles, the fourth magnetic particles, and the like may be measured using the above-described method. Meanwhile, it is conjectured that the average particle diameter of the magnetic particles such as the first magnetic particles, the second magnetic particles, the third magnetic particles, or the fourth magnetic particles contained in the coil component 1 that is a finished product are substantially the same as the average particle diameter of the raw material magnetic particles (that is, magnetic particles used to produce a magnetic paste or a magnetic sheet described later). The average particle diameter of the raw material magnetic particles may be determined by measuring the median diameter D50 on a volume basis by using a laser diffraction-scattering method.

Preferably, each first magnetic particle has an oxide film on the surface. In the case in which each first magnetic particle has an oxide film, it is preferable that the first magnetic particles be bonded to each other with the oxide film interposed therebetween. In the present specification, "oxide film" denotes a film composed of an oxide and may be a film of, for example, a metal oxide or a glass (Si-based glass or the like). Since the oxide film has electrical insulation performance, in the case in which the first magnetic particle has the oxide film, the insulation performance of the magnetic portion may be further improved, and the voltage resistance of the coil component 1 may be further improved. The oxide film may be an oxide film that is formed by oxidizing some of the metal element contained in the first magnetic particle. Alternatively, the oxide film may be formed by subjecting the surface of the first magnetic particle to glass coating. The glass coating may be appropriately performed by a known method. The oxide film being a glass film of a phosphoric acid base or the like enables the voltage resistance of the coil component 1 to be further improved. Therefore, it is more preferable that the first magnetic particle have a glass film as the oxide film. The thickness of the oxide film is preferably about 3 nm or more and 100 nm or less (i.e., from about 3 nm to 100 nm), more preferably about 8 nm or more and 50 nm or less (i.e., from about 8 nm to 50 nm), and further preferably about 10 nm or more and 20 nm or less (i.e., from about 10 nm to 20 nm).

Preferably, the first magnetic portion 10 further contains the fourth magnetic particles different from the first magnetic particles in the average particle diameter. The first magnetic portion 10 containing at least two types of magnetic particles having different average particle diameters enables the first magnetic portion 10 to be filled with magnetic particles at a higher density and, as a result, enables the magnetic permeability to be further improved. There is no particular limitation regarding the magnetic material constituting the fourth magnetic particles, and the magnetic material may be appropriately selected in accordance with the predetermined characteristics. In particular, it is preferable that the magnetic material include a metal magnetic material. Preferably, the fourth magnetic particles have a smaller average particle diameter than the first magnetic particles and are composed of any one of pure iron (Fe) and an Fe-containing alloy (FeSi alloy or the like). In the case in which the first magnetic portion 10 contains the fourth magnetic particles, the content (in terms of volume) of the first magnetic particles in the first magnetic portion 10 is preferably greater than the content (in terms of volume) of the fourth magnetic particles. The average particle diameter of the fourth magnetic particles is preferably about 0.1 μm or more and 50 μm or less (i.e., from about 0.1 μm to 50 μm), more preferably about 0.5 μm or more and 30 μm or less (i.e., from about 0.5 μm to 30 μm), and further preferably 1 μm or more and 10 μm or less (i.e., from 1 μm to 10 μm).

Voids may be present inside the first magnetic portion 10. As described later, it is preferable that the porosity of the second magnetic portion 20 be lower than the porosity of the first magnetic portion 10.

Preferably, the first magnetic portion 10 has a multilayer structure. The first magnetic portion 10 having the multilayer structure improves the degree of design flexibility of the coil component 1. For example, in the case in which the coil component 1 provided with the outer electrodes 50 on the bottom surface is produced, the first magnetic portion 10 having the multilayer structure provides an advantage of facilitating extension of the coil conductor 30 toward the bottom surface.

Second Magnetic Portion 20

The second magnetic portion 20 is disposed on at least the upper surface of the first magnetic portion 10. The second magnetic portion 20 has a structure in which isolated magnetic particles or aggregates each composed of several magnetic particles are dispersed in a resin matrix. It is preferable that the second magnetic portion 20 be disposed so as to cover the entire upper surface of the first magnetic portion 10. However, the second magnetic portion 20 may be disposed on only part of the upper surface of the first magnetic portion 10 in accordance with the arrangement of other members, for example, the outer electrodes 50. Preferably, the second magnetic portion 20 may be disposed on the upper surface of the first magnetic portion 10 and, in addition, on the four side surfaces adjacent to the upper surface. In this case, the second magnetic portion 20 may be disposed on only part of each of the four side surfaces but is preferably disposed on the entire surface of each of the four side surfaces. The moisture resistance and the voltage resistance of the coil component 1 may be improved as the area of the region in which the second magnetic portion 20 is disposed (that is, the region covered with the second magnetic portion 20) in the surface of the first magnetic portion 10 increases. Meanwhile, in the case in which the coil component 1 is provided with an insulating film 40 described later, the moisture resistance and the voltage resistance of the coil component 1 may be improved as the area of the region in which any one or more of the second magnetic portion 20 and the insulating film 40 is disposed (that is, the region covered with any one or more of the second magnetic portion 20 and the insulating film 40) in the surface of the first magnetic portion 10 increases. In this regard, part of the first magnetic portion 10 may be exposed at the surface of the coil component 1 according to the present embodiment.

Second Magnetic Particles

There is no particular limitation regarding the magnetic material constituting the second magnetic particles, and the magnetic material may be appropriately selected in accordance with the predetermined characteristics. As described above, since the second magnetic portion 20 is in no need of high-temperature firing, the second magnetic portion 20 may be particles composed of a magnetic material having magnetic permeability that readily deteriorates due to heat. In this manner, various materials can be appropriately selected as the second magnetic particles in accordance with the predetermined characteristics. Therefore, the characteristics (direct current superposition characteristics and the like) of the coil component 1 may be readily adjusted. As a result, the coil component 1 having excellent characteristics may be realized. Preferably, the second magnetic particles are composed of pure iron (Fe) or a nanocrystalline material. In the case in which pure iron is used as the magnetic material constituting the second magnetic particles, the direct current superposition characteristics of the coil component 1 may be improved since pure iron has a high saturation magnetic flux density Bs. In the case in which a nanocrystalline material is used as the magnetic material constituting the second magnetic particles, eddy current loss may be reduced, and, as a result, the direct current superposition characteristics of the coil component 1 may be improved.

More specifically, the second magnetic particles may be composed of at least one magnetic material selected from a group consisting of ceramic magnetic bodies (ferrite and the like) and metal magnetic materials (pure iron (Fe), alloys such as FeSi, FeAl, and FeSiCr, and the like). Of these, it is preferable that the second magnetic particles include a metal magnetic material. Using the second magnetic particles including the metal magnetic material enables the direct current superposition characteristics of the coil component 1 to be further improved. More preferably, the second magnetic particles are composed of pure iron. Further preferably, the second magnetic particles consist of pure iron. In the case in which the second magnetic particles include the metal magnetic material, the second magnetic particles may be any one of an amorphous metal, nanocrystalline particles, and crystalline particles.

The average particle diameter of the second magnetic particles is preferably about 1 μm or more and 50 μm or less (i.e., from about 1 μm to 50 μm), more preferably about 1 μm or more and 30 μm or less (i.e., from about 1 μm to 30 μm), and further preferably about 3 μm or more and 20 μm or less (i.e., from about 3 μm to 20 μm).

Preferably, the first magnetic particles and the second magnetic particles differ from each other in at least one of the average particle diameter and the composition. Selecting particles that differ from the first magnetic particles in the average particle diameter and/or composition as the second magnetic particles further facilitates improving the magnetic permeability of the magnetic portion and further facilitates improving the direct current superposition characteristics of the coil component 1.

The compositions of the first magnetic particles and the second magnetic particles may be measured by the method described below. A cross section of the coil component 1 is formed and is processed by ion milling by applying the same technique as described above. The resulting cross section is subjected to XPS, EDX, or TOF-SIMS analysis with respect to each of the first magnetic particles and the second magnetic particles so that components contained in each of the first magnetic particles and the second magnetic particles may be determined. In this regard, the compositions of the third magnetic particles and the fourth magnetic particles described later may be measured using the method described above.

Preferably, the second magnetic particles are nanocrystalline particles. In the present specification, "nanocrystalline particles" denotes particles composed of a nanocrystalline material and "nanocrystalline material" denotes a material in which crystal grains having an average grain size of several nanometers or more to several tens of nanometers or less (i.e., from several nanometers to several tens of nanometers) are dispersed in an amorphous phase or a polycrystalline substance composed of crystal grains having an average grain size of several nanometers or more to several tens of nanometers or less (i.e., from several nanometers to several tens of nanometers). The second magnetic particles being nanocrystalline particles enables eddy current loss to be reduced and, as a result, enables the direct current superposition characteristics of the coil component 1 to be improved. Preferably, the nanocrystalline particles are, for example, particles composed of pure iron and/or a nanocrystalline material of FeSi.

Alternatively, it is preferable that the second magnetic particles be amorphous magnetic particles. The second magnetic particles being amorphous magnetic particles reduces iron loss and increases efficiency.

Preferably, each second magnetic particle has an oxide film on the surface. The second magnetic particle having an oxide film enables the insulation performance of the magnetic portion to be further improved and enables the voltage resistance of the coil component 1 to be further improved. The oxide film of the second magnetic particle may be a film of, for example, a metal oxide or a glass (Si-based glass or the like). Preferably, the oxide film of the second magnetic particle is a glass film (film of Si-based glass, P-based glass (phosphoric acid glass or the like), or Bi-based glass). The thickness of the oxide film is preferably about 3 nm or more and 100 nm or less (i.e., from about 3 nm to 100 nm), more preferably about 8 nm or more and 50 nm or less (i.e., from about 8 nm to 50 nm), and further preferably about 10 nm or more and 20 nm or less (i.e., from about 10 nm to 20 nm).

Resin

There is no particular limitation regarding the type of the resin contained in the second magnetic portion 20, and the resin may be appropriately selected in accordance with the predetermined characteristics. The second magnetic portion 20 may contain at least one resin selected from a group consisting of, for example, epoxy-based resins, phenol resins, polyester resins, polyimide resins, polyolefin resins, Si-based resins, acrylic resins, polyvinyl butyral resins, cellulose resins, and alkyd resins. The resin content in the second magnetic portion 20 is greater than the resin content in the first magnetic portion 10. The second magnetic portion 20 having a greater resin content than the first magnetic portion 10 enables the coil component 1 having high moisture resistance, high voltage resistance, and excellent magnetic characteristics to be realized.

Preferably, the second magnetic portion further contains the third magnetic particles that differ from the second magnetic particles in the average particle diameter. The second magnetic portion 20 containing at least two types of magnetic particles having different average particle diameters enables the second magnetic portion 20 to be filled with magnetic particles at a higher density and, as a result, enables the magnetic permeability to be further improved. There is no particular limitation regarding the magnetic material constituting the third magnetic particles, and the magnetic material may be appropriately selected in accordance with the predetermined characteristics. In particular, it is preferable that the magnetic material include a metal magnetic material. Preferably, the third magnetic particles have a smaller average particle diameter than the first magnetic particles and are composed of any one of pure iron (Fe) and an Fe-containing alloy (FeSi alloy or the like). In the case in which the second magnetic portion 20 contains the third magnetic particles, the content (in terms of volume) of the second magnetic particles in the second magnetic portion 20 is preferably greater than the content (in terms of volume) of the third magnetic particles. The average particle diameter of the third magnetic particles is preferably about 0.1 μm or more and 50 μm or less (i.e., from about 0.1 μm to 50 μm), more preferably about 0.5 μm or more and 30 μm or less (i.e., from about 0.5 μm to 30 μm), and further preferably 1 μm or more and 10 μm or less (i.e., from 1 μm to 10 μm).

Preferably, at least one of the first magnetic portion 10 and the second magnetic portion 20 contains flat-shaped magnetic particles. In the present specification, "flat shape" denotes a shape having an aspect ratio (a/b) defined as the ratio of the major axis a of the magnetic particle to the minor axis b of about 10 or more and 150 or less (i.e., from about 10 to 150). In the case in which the first magnetic portion 10 and/or the second magnetic portion 20 contains flat-shaped magnetic particles, preferably, the flat-shaped magnetic particles are oriented so that flat surfaces of the magnetic particles are arranged in the direction of the magnetic field generated inside the coil component 1. As an example, each arrow in FIG. 4 indicates the direction of a magnetic field generated in a magnetic portion 100 of the coil component 1. The flat-shaped magnetic particles being oriented so that flat surfaces of the magnetic particles are arranged in the direction of the magnetic field enables the magnetic permeability of the magnetic portion to be increased to a great extent and enables the coil component 1 having very excellent magnetic characteristics to be obtained.

In the case in which the first magnetic portion 10 contains the flat-shaped magnetic particles, the first magnetic particles and/or the fourth magnetic particles may have a flat shape or flat-shaped magnetic particles may be further contained in addition to the first magnetic particles and, if present, the fourth magnetic particles. Likewise, in the case in which the second magnetic portion 20 contains the flat-shaped magnetic particles, the second magnetic particles and/or the third magnetic particles may have a flat shape or flat-shaped magnetic particles may be further contained in addition to the second magnetic particles and, if present, the third magnetic particles. The flat-shaped magnetic particles may be contained in one or both of the first magnetic portion 10 and the second magnetic portion 20.

Voids may be present inside the first magnetic portion 10 and the second magnetic portion 20. The amount of voids present inside the magnetic portion may be evaluated on the basis of the porosity determined by the following method. A cross section of the coil component 1 is formed and is processed by ion milling by applying the same technique as the technique described in measuring the resin content above. The processed cross section is observed by using an SEM. The magnification of the SEM is set to be preferably about 500 times or more and 5,000 times or less (i.e., from about 500 times to 5,000 times). The area of voids (region in which neither magnetic particles nor resin is present) located between magnetic particles in the resulting SEM image is determined. The porosity is denoted as the ratio of the area of voids to the area of the entire SEM image. Preferably, the porosity of the second magnetic portion 20 is lower than the porosity of the first magnetic portion 10. The porosity of the second magnetic portion 20 covering at least the upper surface of the first magnetic portion 10 being relatively low enables the moisture and the plating solution to be more effectively suppressed from entering the coil component 1. The porosity of the second magnetic portion 20 is preferably about 5% or less, more preferably 3% or less, and further preferably 1% or less. It is most preferable that substantially no voids be included (that is, that the porosity be 0%).

The average thickness of the second magnetic portion 20 with respect to each surface of the first magnetic portion 10 on which the second magnetic portion 20 is disposed is preferably about 10 μm or more and 200 μm or less (i.e., from about 10 μm to 200 μm). Since the second magnetic portion 20 has a higher resin content than the first magnetic portion 10, the second magnetic portion 20 is hard to be cracked compared with the first magnetic portion 10. Disposing the second magnetic portion 20 so as to cover at least the upper surface of the first magnetic portion 10 and setting the average thickness of the second magnetic portion 20 to be about 10 μm or more enable cracking to be suppressed from occurring in the coil component 1. As shown in, for example, FIG. 9, this effect is particularly considerable in the case in which the first magnetic portion 10 is present outside the winding portion of the coil conductor 30. Regarding the first magnetic portion 10, cracking tends to occur in the portion outside the coil conductor 30. In this case, the second magnetic portion 20 having an average thickness of about 10 μm or more enables cracking to be effectively suppressed from occurring in the first magnetic portion 10 that is present outside the coil conductor 30. In addition, the second magnetic portion 20 having an average thickness of about 10 μm or more enables the moisture and the plating solution to be more effectively suppressed from entering the coil component 1 and enables the moisture resistance and the voltage resistance of the coil component 1 to be further improved. Meanwhile, when the second magnetic portion 20 has an average thickness of about 200 μm or less, it is possible to relatively increase the volume of the first magnetic portion 10 in the entire coil component 1. Since the first magnetic portion 10 has a relatively low resin content (or contains substantially no resin) and is filled with magnetic particles at a high density, the first magnetic portion 10 having a relatively large volume enables the magnetic characteristics of the coil component 1 to be further improved. The average thickness of the second magnetic portion 20 is more preferably about 10 μm or more and 100 μm or less (i.e., from about 10 μm to 100 μm) with respect to each surface of the first magnetic portion 10 on which the second magnetic portion 20 is disposed.

In the case in which the second magnetic portion 20 is disposed on the upper surface of the first magnetic portion 10 and on the surfaces other than the upper surface (for example, the four side surfaces adjacent to the upper surface), the average thickness of the second magnetic portion 20 on each surface of the first magnetic portion 10 may be the same or may differ from each other. In the case in which the second magnetic portion 20 is disposed on the upper surface of the first magnetic portion 10 and on the surfaces other than the upper surface (for example, the four side surfaces adjacent to the upper surface), the average thickness of the second magnetic portion 20 on the upper surface of the first magnetic portion 10 is preferably greater than the average thickness of the second magnetic portion 20 on each of the surfaces other than the upper surface.

The average thickness of the second magnetic portion 20 may be measured in the procedure described below. A cross section is formed by cutting the coil component 1 in the direction perpendicular to the surface of the first magnetic portion 10 on which the second magnetic portion 20 that is the measurement target is disposed. The cross section of the coil component 1 is formed and is processed by ion milling by applying the same technique as the technique described in measuring the resin content above. The processed cross section is observed by using an SEM, the thickness of the second magnetic portion 20 is measured at a plurality of positions, and the average value thereof may be taken as the average thickness of the second magnetic portion 20.

Preferably, some of the components constituting the second magnetic portion 20 permeate inside the first magnetic portion 10. Some of the components (a resin component and the like) constituting the second magnetic portion 20 may permeates inside the first magnetic portion 10 in accordance with the porosity of the first magnetic portion 10, a pressurization condition in the production steps of the coil component 1 described later, the viscosity of the resin contained in the second magnetic portion 20, and the like. In this case, the adhesiveness between the first magnetic portion 10 and the second magnetic portion 20 may be improved, and, as a result, the moisture resistance and the voltage resistance of the coil component 1 may be further improved.

Coil Conductor 30

The coil conductor 30 is disposed inside the first magnetic portion 10. The coil conductor 30 may include a plurality of coil conductor layers stacked in the winding axis direction of the coil conductor 30. Both ends of the coil conductor 30 extend to the outer surface of the magnetic portion and are electrically coupled to the outer electrodes 50.

Preferably, both ends of the coil conductor 30 extend to the lower surface of the magnetic portion. For example, in the case in which the second magnetic portion 20 is disposed on the upper surface of the first magnetic portion 10 and the four side surfaces adjacent to the upper surface as shown in FIG. 1, it is preferable that both ends of the coil conductor 30 extend to the lower surface of the first magnetic portion 10. In the case in which both ends of the coil conductor 30 extend to the lower surface of the magnetic portion, the outer electrodes 50 may be disposed on the bottom surface only of the magnetic portion. The outer electrodes 50 of the coil component 1 being such bottom electrodes enable short circuit between adjacent coil components 1 to be suppressed from occurring. In addition, the outer electrodes 50 being the bottom electrodes enable the size of the outer electrodes to be reduced. As a result, since the volume of the magnetic portion in the entire coil component 1 can be relatively increased, the magnetic characteristics of the coil component 1 may be further improved. Meanwhile, the coil component 1 may be required to undergo bottom-surface-mounting. In this case, the outer electrodes being bottom electrodes may provide an advantage.

The coil conductor 30 excluding the extended portions in contact with the outer electrodes 50 may be completely embedded inside the first magnetic portion 10. However, as shown in FIG. 1, part of the coil conductor 30 may be exposed at the surface of the first magnetic portion 10 (interface between the first magnetic portion 10 and the second magnetic portion 20). For example, as shown in FIG. 1, in the case in which the first magnetic portion 10 has four side surfaces parallel to the winding axis of the coil conductor 30, it is preferable that the coil conductor 30 be exposed at one or more surfaces of the four side surfaces of the first magnetic portion 10. In this case, the inner diameter of the winding portion of the coil conductor 30 can be increased, and, as a result, the magnetic characteristics (inductance value, direct current superposition characteristics, and the like) may be further improved. The second magnetic portion 20 that is hard to be cracked compared with the first magnetic portion 10 being in direct contact with the coil conductor 30 enables cracking due to impact to be suppressed from occurring. In the coil component 1 shown in FIG. 1, the coil conductor 30 is exposed at each of the four side surfaces of the first magnetic portion 10. Preferably, the coil conductor 30 is exposed at the upper surface of the first magnetic portion 10 as shown in FIG. 1. Preferably, the coil conductor 30 is composed of a metal conductor, for example, Ag or Cu. The coil conductor 30 may further contain glass. In the case in which the coil conductor 30 and the outer electrodes 50 are formed by co-firing as described later, the coil conductor 30 and the outer electrodes 50 containing the glass enable the bonding strength between the coil conductor 30 and the outer electrodes 50 to be enhanced.

Insulating Film 40

As shown in FIG. 1, the coil component 1 may include an insulating film 40. In the coil component 1, it is preferable that the insulating film 40 be disposed on the lower surface of the first magnetic portion 10. In the present specification, "insulating film" denotes a layer having higher insulation performance than the first magnetic portion 10 (that is, a layer having high electrical resistance) in a broad sense and denotes a layer having a volume resistivity of $10^6$ Ωcm or more in a narrow sense. The insulating film 40 being present enables the moisture and the plating solution to be more effectively suppressed from entering the coil component 1. As a result, the moisture resistance and the voltage resistance of the coil component 1 may be further improved. Meanwhile, in the case in which the outer electrodes 50 are disposed on the bottom surface as shown in FIG. 1, a short pass may occur between the outer electrodes 50. In this case, the insulating film 40 being disposed on the lower surface (bottom surface) of the first magnetic portion 10 enables the insulation performance between the outer electrodes 50 to be improved and enables the voltage resistance to be further improved. Regarding the coil component 1, as shown in FIG. 1, it is preferable that the entire surface of the first magnetic portion 10 be covered with any one or more of the second magnetic portion 20, the insulating film 40, and the outer electrodes 50. Such a configuration enables the moisture and the plating solution to be most effectively suppressed from entering the coil component 1. In this regard, the insulating film 40 is not an indispensable constituent of the coil component 1 according to the present embodiment, and the effect of the present disclosure is exerted without including the insulating film 40.

In the case in which the insulating film 40 is disposed on the lower surface of the first magnetic portion 10 (that is, the surface opposite to the upper surface of the first magnetic portion 10 provided with the second magnetic portion 20), it is preferable that the insulating film 40 does not extend to the upper surface of the second magnetic portion 20.

Preferably, the insulating film 40 contains a resin. The insulating film 40 containing a resin enables the insulating film 40 to be readily formed by a technique of screen printing, dip-coating, or the like. There is no particular limitation regarding the composition of the resin contained in the insulating film 40, and preferably, at least one resin selected from a group consisting of, for example, epoxy-based resins, polyurethane resins, polyester resins, polyamide-imide resins, Si-based resins, and acrylic resins.

Outer Electrode 50

There is no particular limitation regarding the shape and the position of each of the outer electrodes 50, and the shape and the position of each of the outer electrodes 50 may be selected in accordance with the use and the like. Preferably, the outer electrodes 50 are bottom surface electrodes disposed on the bottom surface (lower surface) of the magnetic portion as shown in FIG. 1. The outer electrodes 50 being disposed on the bottom surface only of the magnetic portion enable the size of the outer electrodes 50 to be reduced. As a result, since the volume of the magnetic portion in the entire coil component 1 can be relatively increased, the magnetic characteristics of the coil component 1 may be further improved. Meanwhile, the coil component 1 may be required to undergo bottom-surface-mounting. In this case, the outer electrodes 50 being bottom electrodes may provide an advantage. As shown in FIG. 1, each of the outer electrodes 50 may have a structure in which a first outer electrode 50*a* serving as an underlying electrode is covered with a second outer electrode 50*b* that is a plating layer. In this regard, as described later, the outer electrode 50 may be composed of a layer (serving as the first outer electrode indicated by reference 50*a* in FIG. 1) formed of the same material as the coil conductor 30 and the second outer electrode 50*b* that is a plating layer, but the outer electrode 50 may also be composed of only the second outer electrode 50*b* that includes at least one plating layer. In this case, the outer electrode is formed so that the end portion of the coil conductor 30 extending to the surface of the magnetic portion and the outer electrode 50 are electrically coupled to each other. Meanwhile, the layer of the outer electrode 50 may be formed by sputtering or dip-coating instead of the second outer electrode 50*b* that is a plating layer.

In the case in which the outer electrode 50 includes a layer formed of the same material as the coil conductor 30, for example, the first outer electrode 50*a*, it is preferable that the first outer electrode 50*a* be composed of a metal conductor, for example, Ag, Cu, Ni, or Sn. The first outer electrode 50*a* may further contain glass. In the case in which the coil conductor 30 and the first outer electrode 50*a* are formed by co-firing, the coil conductor 30 and the first outer electrode 50*a* containing the glass enable the bonding strength between the coil conductor 30 and the first outer electrode 50*a* to be enhanced and enable the mechanical strength of the first outer electrode 50*a* to be enhanced.

Second Embodiment

Next, a coil component 1 according to the second embodiment will be described below with reference to FIG. 2. The coil component 1 according to the second embodiment has the same configuration as the coil component 1 according to the first embodiment except that insulating layers 60 are further included. Therefore, the insulating layer 60 will be mainly described below in detail and explanations of the other configurations are omitted. The moisture resistance of the coil component 1 according to the second embodiment may be improved in the same manner as the coil component 1 according to the first embodiment. Further, the coil component 1 according to the second embodiment may have high moisture resistance and excellent magnetic characteristics.

Insulating Layer 60

Figure 2:
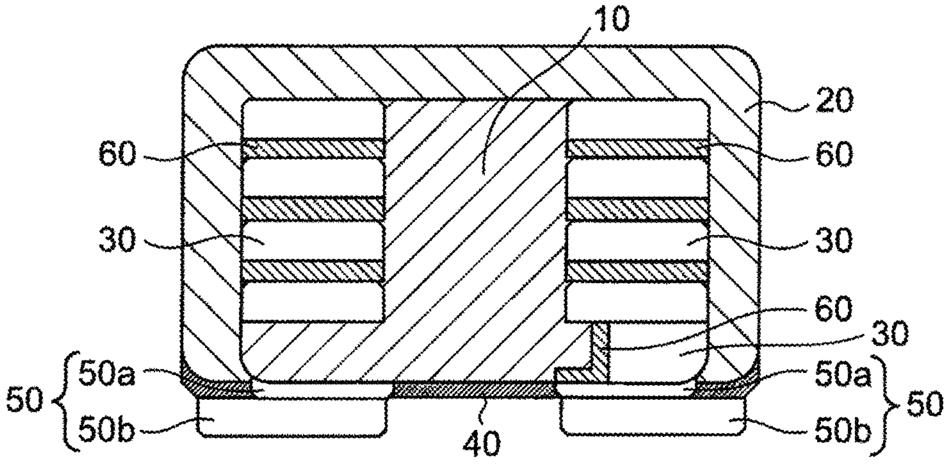
FIG. 2 is a schematic sectional view of a coil component according to a second embodiment of the present disclosure.

In the coil component 1 shown in FIG. 2, the coil conductor 30 includes a plurality of coil conductor layers stacked in the winding axis direction of the coil conductor 30, and an insulating layer 60 is disposed between each of the plurality of coil conductor layers. In the present specification, "insulating layer" denotes a layer having higher insulation performance than the coil conductor 30 (that is, a layer having high electrical resistance) in a broad sense and denotes a layer having a volume resistivity of $10^6$ Ω2 cm or more in a narrow sense. The insulating layer 60 being disposed between the coil conductor layers enables short circuit between the coil conductor layers to be suppressed from occurring and enables the reliability of the coil component 1 to be improved. In the coil component 1 shown in FIG. 2, the insulating layers 60 are disposed at only positions in accord with the coil conductor layers in top view. In this regard, the arrangement of the insulating layers 60 is not limited to that shown in FIG. 2, and the insulating layers 60 may also be disposed at positions that are not in accord with the coil conductor layers in top view. Preferably, the insulating layer 60 is disposed at each of the regions between adjacent coil conductor layers as shown in FIG. 2. The effect of suppressing short circuit from occurring may be further enhanced by such a configuration. In this regard, the insulating layer 60 may be disposed in only one of the regions between adjacent coil conductor layers. The effect of suppressing short circuit from occurring may also be exerted due to such a configuration. In addition, in the coil component 1 shown in FIG. 2, the insulating layer 60 is also disposed on the side surface of the extended portion of the coil conductor 30. The insulating layer 60 being disposed on the side surface of the extended portion enables the effect of suppressing short circuit from occurring to be further enhanced.

The insulating layer 60 may be composed of a magnetic material or may be composed of a nonmagnetic material. Preferably, the volume resistivity of the insulating layer 60 is higher than the volume resistivity of the first magnetic portion 10. Therefore, it is preferable that the insulating layer 60 be composed of a material having a higher volume resistivity than the material constituting the first magnetic portion 10. The insulating layer 60 may contain, for example, metal magnetic particles having a small particle diameter (average particle diameter of about 0.1 μm or more and 5 μm or less (i.e., from about 0.1 μm to 5 μm)). The insulation performance of the metal magnetic particles increases as the particle diameter decreases. Therefore, the insulating layer 60 may be formed by using metal magnetic particles having a small particle diameter. Preferably, each of the metal magnetic particles has an insulating coating film on the surface.

Preferably, the specific magnetic permeability of the insulating layer 60 is lower than the specific magnetic permeability of the first magnetic portion 10. In this case, the direct current superposition characteristics of the coil component 1 may be further improved. More preferably, the insulating layer 60 is a nonmagnetic ceramic layer. The insulating layer 60 being a nonmagnetic ceramic layer enables the direct current superposition characteristics of the coil component 1 to be further improved. The nonmagnetic ceramic layer may contain, for example, nonmagnetic ferrite.

Figure 3:
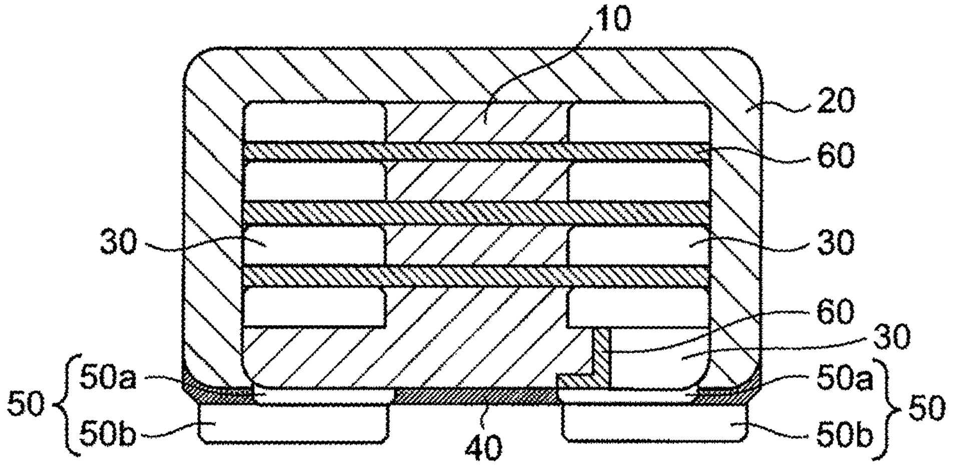
FIG. 3 is a schematic sectional view of a modified example of the coil component according to the second embodiment of the present disclosure.

FIG. 3 shows a modified example of the coil component 1 according to the second embodiment. In the coil component 1 shown in FIG. 3, the insulating layers 60 are also disposed at positions that are not in accord with the coil conductor 30 in top view. Such a configuration enables short circuit between the coil conductor layers to be further effectively suppressed from occurring.

Method for Manufacturing Coil Component

The method for manufacturing the coil component according to the present disclosure will be described below with reference to FIG. 5A to FIG. 9, where the coil component 1 according to the first embodiment is taken as an example. In this regard, the method described below is just an example, and the method for manufacturing the coil component according to the present disclosure is not limited to the following method.

Preparation of Magnetic Paste

A magnetic paste for forming the first magnetic portion 10 is prepared. First magnetic particles, a resin, and a solvent are kneaded so as to prepare the magnetic paste. The first magnetic particles are as described above in detail. Regarding the first magnetic particles, for example, magnetic particles having D50 of about 10 μm may be used. Alternatively, magnetic particles provided with an oxide film, for example, a phosphate-glass-based oxide film, in advance may be used as the first magnetic particles. Examples of the resin used for the magnetic paste include at least one resin selected from a group consisting of polyvinyl butyral resins, acrylic resins, epoxy-based resins, cellulose resins, and alkyd resins. Examples of the solvent used for the magnetic paste include ethanol, toluene, xylene, terpineol, dihydroterpineol, butyl carbitol, and butyl carbitol acetate and/or texanol. Preferably, the contents of the magnetic particles (including the first magnetic particles and, as the situation demands, the fourth magnetic particles and the like), the resin, and the solvent in the magnetic paste are about 50% by weight or more and 95% by weight or less (i.e., from about 50% by weight to 95% by weight), about 1% by weight or more and 20% by weight or less (i.e., from about 1% by weight to 20% by weight), and about 5% by weight or more and 30% by weight or less (i.e., from about 5% by weight to 30% by weight), respectively, with reference to the total weight of the magnetic paste.

Production of Magnetic Sheet

A magnetic sheet for forming the second magnetic portion 20 is prepared. A paste which is for producing the magnetic sheet and in which second magnetic particles, a resin, and a solvent are kneaded is formed into the shape of a sheet, and drying is performed so as to prepare the magnetic sheet. The second magnetic particles are as described above in detail. Regarding the second magnetic particles, for example, magnetic particles having D50 of about 20 μm may be used. Alternatively, magnetic particles provided with an oxide film, for example, a phosphate-glass-based oxide film, in advance may be used as the second magnetic particles. As an example, a combination of the first magnetic particles without being provided with a glass-based oxide film in advance and the second magnetic particles provided with a glass-based oxide film (phosphate-glass-based oxide film or the like) in advance may be adopted. In this case, the thickness of the oxide film of the second magnetic particles may be, for example, about 10 nm. Examples of the resin used for the paste for producing the magnetic sheet include at least one resin selected from a group consisting of epoxy-based resins, phenol resins, polyester resins, polyimide resins, polyolefin resins, Si-based resins, and acrylic resins. Examples of the solvent used for the paste for producing the magnetic sheet include methyl ethyl ketone (MEK), N,N-dimethylformamide (DMF), propylene glycol monomethyl ether (PGM), propylene glycol monomethyl ether acetate (PMA), and dipropylene glycol monomethyl ether (DPM) and/or dipropylene glycol monomethyl ether acetate (DPMA). The above-described resin used for the magnetic paste and the resin used for the paste for producing the magnetic sheet may have the same composition or may have different compositions. Meanwhile, the solvent used for the magnetic paste and the solvent used for the paste for producing the magnetic sheet may have the same composition or may have different compositions. Preferably, the contents of the magnetic particles, the resin, and the solvent are about 50% by weight or more and 90% by weight or less (i.e., from about 50% by weight to 90% by weight), about 1% by weight or more and 20% by weight or less (i.e., from about 1% by weight to 20% by weight), and about 5% by weight or more and 30% by weight or less (i.e., from about 5% by weight to 30% by weight), respectively, with reference to the total weight of the paste for producing the magnetic sheet. In this regard, a commercially available magnetic sheet may be used as the magnetic sheet.

Preparation of Conductor Paste

A conductor paste for forming the coil conductor 30 and, as the situation demands, the first outer electrode 50*a* is prepared. Particles of a metal conductor, for example, Ag or Cu, a binder, and a solvent are kneaded so as to prepare the conductor paste. The conductor paste may further contain glass. As described later, in the case in which the coil conductor 30 and the first outer electrode 50*a* are formed of the same conductor paste by co-firing, the conductor paste containing the glass enables the bonding strength between the coil conductor 30 and the first outer electrode 50*a* to be enhanced.

Preparation of Insulating Paste

An insulating paste for forming the insulating film 40 is prepared. Preferably, the insulating paste contains at least one resin selected from a group consisting of epoxy-based resins, Si-based resins, polyimide-based resins, polyamide-imide-based resins, fluorine-based resins, and acrylic resins.

Formation of First Magnetic Portion 10

Figures 5A, 5B, 5C, 5D, 5E, 5F, 5G, 5H:
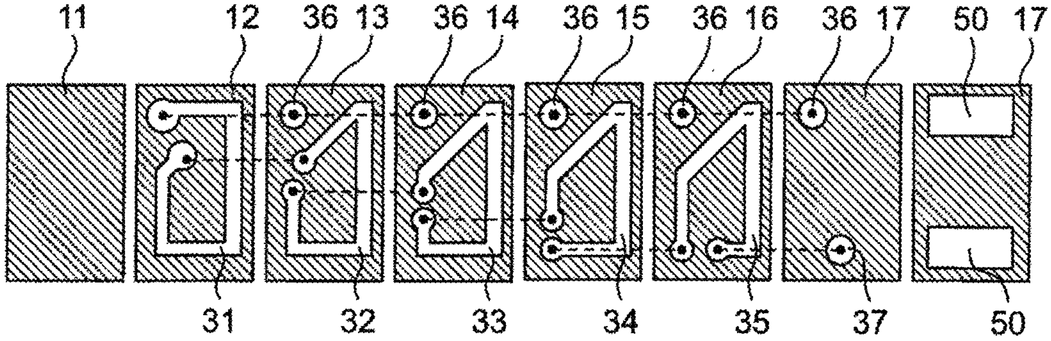
FIGS. 5A to 5H are schematic diagrams showing a method for manufacturing the coil component according to the first embodiment of the present disclosure.

As shown in FIGS. 5A to 5H, a multilayer body is formed by stacking first magnetic layers 11, 12, 13, 14, 15, 16, and 17, coil conductor layers 31, 32, 33, 34, and 35, and via layers 36 and 37. A base member on which the first magnetic layer and the coil conductor layer are stacked is prepared. The base member may be, for example, a PET film or a flat die subjected to releasing treatment. The base member is coated with the magnetic paste by screen printing or the like so as to form the first magnetic layer 11, and drying is performed in an oven at a temperature of about 150° C. (FIG. 5A).

The dried first magnetic layer 11 is coated with the conductor paste by screen printing or the like so as to form the coil conductor layer 31, and drying is performed in an oven at a temperature of about 150° C. A portion not provided with the coil conductor layer 31 is coated with the magnetic paste so as to form the first magnetic layer 12, and drying is performed in an oven at a temperature of about 150° C. (FIG. 5B).

The first magnetic layer 12 and the coil conductor layer 31 are coated with the conductor paste so as to form the coil conductor layer 32 and the via layer 36, and drying is performed in an oven. A portion provided with neither the coil conductor layer 32 nor the via layer 36 is coated with the magnetic paste so as to form the first magnetic layer 13, and drying is performed in an oven (FIG. 5C).

As shown in FIG. 5D to FIG. 5G, the coil conductor layers 33, 34, and 35, the via layers 36 and 37, and the first magnetic layers 14, 15, 16, and 17 are successively formed in the same procedure as the above-described procedure, and drying is performed in an oven. As shown in FIG. 5H, the first magnetic layer 17 and the via layers 36 and 37 are coated with the conductor paste so as to form the first outer electrodes 50*a*, and drying is performed in an oven. In this manner, the multilayer body is obtained.

In the example shown in FIGS. 5A to 5H, total 7 layers of the first magnetic layers and total 5 layers of the coil conductor layers are stacked. However, the number of the first magnetic layers and the coil conductor layers stacked and the shape of the coil pattern are not limited to the configuration shown in FIGS. 5A to 5H, and a straight shape and the like may be appropriately designed in accordance with, for example, the predetermined characteristics. The number of the coil conductor layers stacked may be, for example, about 1 layer or more and 50 layers or less (i.e., from about 1 layer to 50 layers). FIGS. 5A to 5H show the procedure for forming the first magnetic layers, the coil conductor layers, and the via layers corresponding to one first magnetic portion 10. However, in practice, the first magnetic layers, the coil conductor layers, and the via layers corresponding to a plurality of first magnetic portions 10 are formed simultaneously. In another method, the coil conductor layers may be formed by a photolithography or additive method.

The thus obtained multilayer body is pressurized and cut into the size corresponding to the first magnetic portion 10. At this time, the coil conductor layers may be exposed at the surface of the multilayer body formed by cutting but are not limited to being exposed.

The cut multilayer body is subjected to barrel finishing so as to round the corner portions of the multilayer body.

The multilayer body after barrel finishing is heated at a temperature of about 400° C. so as to remove the binder contained in the multilayer body.

Figure 6:
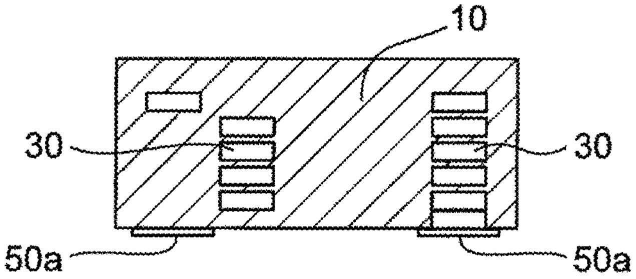
FIG. 6 is a schematic diagram showing the method for manufacturing the coil component according to the first embodiment of the present disclosure.

The resulting multilayer body is fired in an air atmosphere at a temperature of about 700° C. so as to obtain the first magnetic portion 10 including the coil conductor 30 (FIG. 6). An oxide film may be formed on the surface of each of the first magnetic particles during firing, and the oxide films may be bonded to each other. The thickness of the formed oxide film may be, for example, about 10 nm. In the example shown in FIG. 5A to FIG. 9, the coil conductor 30 and the first outer electrodes 50*a* are co-fired.

The size of the resulting first magnetic portion 10 may be, for example, L (length): 1.4 mm×W (width): 0.6 mm×T (thickness): 0.7 mm. In the example shown in FIG. 5A to FIG. 9, both ends of the coil conductor 30 extend to the bottom surface of the first magnetic portion 10 (FIG. 6).

The first magnetic portion 10 may contain a resin. The resin contained in the first magnetic portion 10 may be derived from the resin contained in the magnetic paste. At least part of the resin contained in the magnetic paste may be lost due to decomposition and the like during firing, and at least part of the resin contained in the magnetic paste may remain in the first magnetic portion 10. In this regard, it is preferable that the first magnetic portion 10 contain substantially no resin.

The first magnetic portion 10 after firing may be impregnated with the resin. The first magnetic portion 10 being impregnated with the resin enables at least some of voids present in the first magnetic portion 10 to be filled with the resin. As a result, since voids present in the first magnetic portion 10 decrease, moisture and the plating solution may be further suppressed from entering the first magnetic portion 10. Consequently, plating adhesion and poor reliability of the coil component 1 may be further reduced. Examples of the resin with which the first magnetic portion 10 is impregnated include at least one resin selected from a group consisting of epoxy-based resins, phenol resins, polyester resins, polyimide resins, polyolefin resins, Si-based resins, acrylic resins, polyvinyl butyral resins, cellulose resins, and alkyd resins.

A plurality of first magnetic portions 10 are arranged on the adhesive sheet or the like and are fixed. A magnetic sheet is disposed on the upper surfaces of the arranged plurality of first magnetic portions 10, and pressing is performed so as to form the second magnetic portion 20. As another method, the second magnetic portion 20 may be formed by applying, instead of the magnetic sheet, a magnetic paste produced separately and performing drying and pressing. As another method, the second magnetic portion 20 may be formed by placing the first magnetic portion 10 in a die that has a size larger than the first magnetic portion 10, disposing a magnetic sheet on the upper surface of the first magnetic portion 10, and performing pressing. As another method, the second magnetic portion 20 may be formed by mixing magnetic particles (second magnetic particles and the like) and a resin so as to produce a granulated powder, placing the granulated powder into a die in which the first magnetic portion 10 is placed, and performing forming. In the case in which the second magnetic portion 20 is formed by using the die, a cutting step described later is unnecessary.

Figure 7:
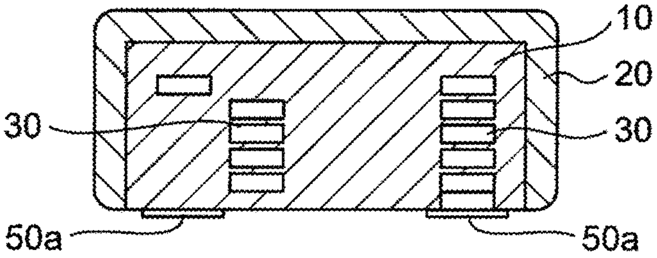
FIG. 7 is a schematic diagram showing the method for manufacturing the coil component according to the first embodiment of the present disclosure.

The first magnetic portion 10 provided with the second magnetic portion 20 on the surface is heated at a temperature of about 200° C. so as to cure the resin. Cutting into the size corresponding to the size of the individual coil component 1 is performed so as to obtain the coil component 1 in which the second magnetic portion 20 is disposed on the upper surface of the first magnetic portion 10 and the four side surfaces adjacent to the upper surface (FIG. 7). In FIG. 7, the second magnetic portion 20 disposed on the upper surface of the first magnetic portion 10 is formed so as to extend over the four side surfaces adjacent to the upper surface.

Figure 8:
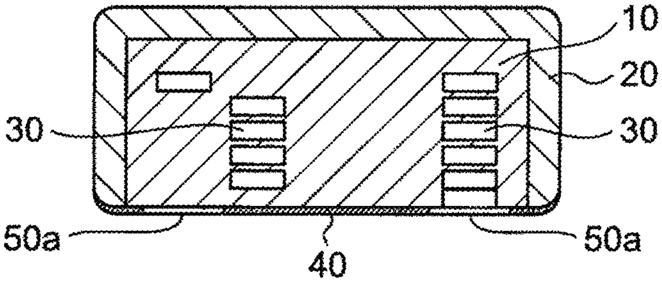
FIG. 8 is a schematic diagram showing the method for manufacturing the coil component according to the first embodiment of the present disclosure.

Subsequently, the lower surface of the coil component 1 is coated with the insulating paste by screen printing or the like so as to form an insulating film 40 (FIG. 8). The insulating film 40 may be formed by electrodeposition coating, dip-coating, or the like.

Figure 9:
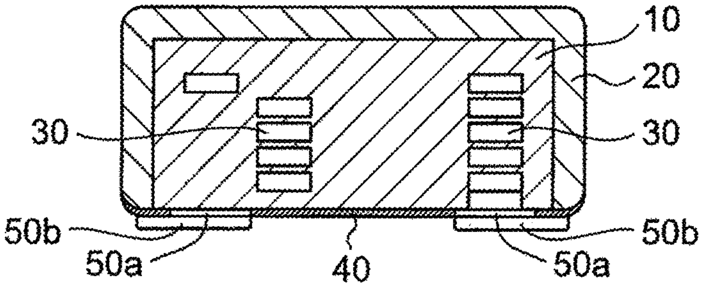
FIG. 9 is a schematic diagram showing the method for manufacturing the coil component according to the first embodiment of the present disclosure.

The second outer electrode 50*b* that is a plating layer is formed on the first outer electrode 50*a* (FIG. 9). At this time, since the second magnetic portion 20 is disposed on the upper surface of the first magnetic portion 10 and the four side surfaces adjacent to the upper surface and the insulating film 40 is disposed on the lower surface of the first magnetic portion 10 (that is, since the entire surface of the first magnetic portion 10 is covered with any one or more of the second magnetic portion 20 and the insulating film 40), the plating solution is suppressed from entering the magnetic portion. A layer of the outer electrode 50 instead of the second outer electrode 50*b* that is a plating layer may be formed by sputtering, dip-coating, or the like. The coil component 1 may be produced in the above-described procedure.

The thus obtained coil component 1 has excellent moisture resistance and voltage resistance and has excellent magnetic characteristics. There is no particular limitation regarding the size of the coil component 1, and the size may be, for example, L (length): 1.6 mm×W (width): 0.8 mm×T (thickness): 0.8 mm.

The above-described manufacturing method relates to the method for manufacturing the coil component 1 according to the first embodiment, and the coil component 1 according to the second embodiment may also be produced by applying the above-described manufacturing method. For example, an insulating layer 60 being stacked between each of the coil conductor layers 31, 32, 33, 34, and 35 shown in FIGS. 5A to 5H enables the coil component 1 according to the second embodiment to be produced.

Figure 10A:
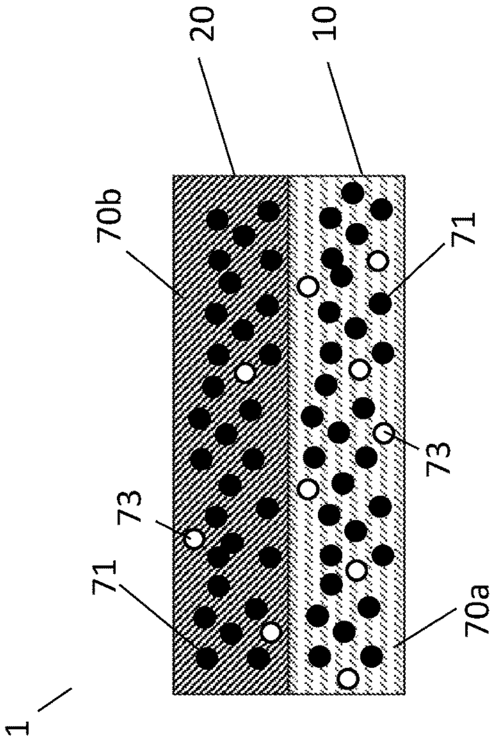
FIGS. 10A to 10E are schematic diagrams showing examples of resins and magnetic particles according to one or more embodiments of the present disclosure.
Figure 10B:
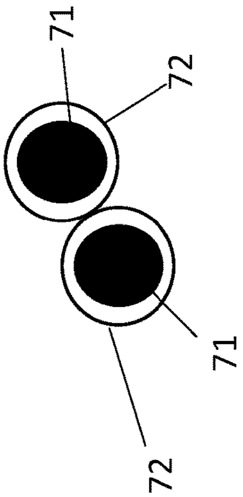
Figure 10C:
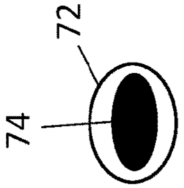
Figure 10D:
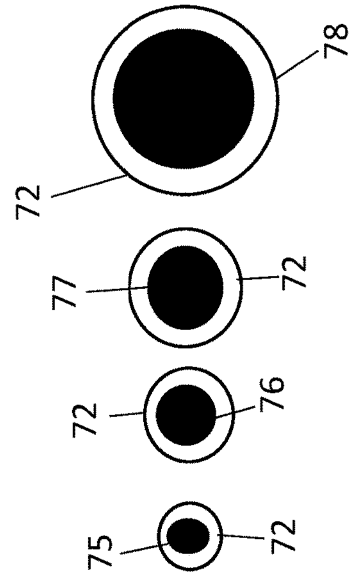
Figure 10E:
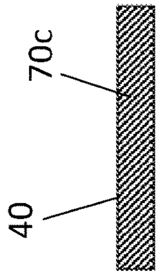

FIG. 10A is a partial sectional view of the coil component 1 showing portions of the first magnetic portion 10 and the second magnetic portion 20. The first magnetic portion 10 contains magnetic particles 71 and a resin 70*a*. The second magnetic portion 20 contains magnetic particles 71 and a resin 70*b*. The porosity of the second magnetic portion 20 is lower than the porosity of the first magnetic portion 10, as represented by pores 73. In FIG. 10A, as shown by the different hatch patterns for the first magnetic portion 10 and the second magnetic portion 20, the resin content in the second magnetic portion 20 is higher than the resin content in the first magnetic portion 10. FIG. 10B shows an example of a plurality a magnetic particles 71 each having an oxide film 72 on the surface of each magnetic particle 71. The magnetic particles shown in FIG. 10B are bonded to each other with the oxide film 72 interposed therebetween. As shown in FIG. 10C, at least one of the first magnetic portion 10 and the second magnetic portion 20 contains flat-shaped magnetic particles 74. The magnetic particles of the magnetic portion 10 and the second magnetic portion 20 can differ from each other in at least one of the average particle diameter and the composition. In FIG. 10D, magnetic particles 75, 76, 77, and 78 are shown with different particle diameters. FIG. 10E is a partial sectional view of a portion of the insulating film 40 (FIG. 1) containing a resin 70*c*.

The present disclosure includes the following aspects but is not limited to these aspects.

Aspect 1

A coil component including a substantially rectangular parallelepiped first magnetic portion that includes a coil conductor, and a second magnetic portion disposed on at least the upper surface of the first magnetic portion, wherein the first magnetic portion contains first magnetic particles including a metal magnetic material, the second magnetic portion contains second magnetic particles and a resin, and the resin content in the second magnetic portion is higher than the resin content in the first magnetic portion.

Aspect 2

The coil component according to aspect 1, wherein each of the first magnetic particles has an oxide film on the surface, and the first magnetic particles are bonded to each other with the oxide film interposed therebetween.

Aspect 3

The coil component according to aspect 1 or aspect 2, wherein the first magnetic portion has a multilayer structure.

Aspect 4

The coil component according to any one of aspects 1 to 3, wherein each of the second magnetic particles includes a metal magnetic material.

Aspect 5

The coil component according to any one of aspects 1 to 4, wherein the coil conductor includes a plurality of coil conductor layers stacked in the winding axis direction of the coil conductor, and an insulating layer is disposed between each of the plurality of coil conductor layers.

Aspect 6

The coil component according to aspect 5, wherein the relative magnetic permeability of the insulating layer is lower than the relative magnetic permeability of the first magnetic portion.

Aspect 7

The coil component according to any one of aspects 1 to 6, wherein the second magnetic portion is disposed on the upper surface and the four side surfaces adjacent to the upper surface of the first magnetic portion, and both ends of the coil conductor extend to the lower surface of the first magnetic portion.

Aspect 8

The coil component according to aspect 7, wherein an insulating film is disposed on the lower surface of the first magnetic portion.

Aspect 9

The coil component according to aspect 8, wherein the insulating film contains a resin.

Aspect 10

The coil component according to any one of aspects 1 to 9, wherein the first magnetic portion has the four side surfaces parallel to the winding axis of the coil conductor, and the coil conductor is exposed at one or more surfaces of the four side surfaces.

Aspect 11

The coil component according to any one of aspects 1 to 10, wherein the first magnetic particles and the second magnetic particles differ from each other in at least one of the average particle diameter and the composition.

Aspect 12

The coil component according to any one of aspects 1 to 11, wherein the porosity of the second magnetic portion is lower than the porosity of the first magnetic portion.

Aspect 13

The coil component according to any one of aspects 1 to 12, wherein the average thickness of the second magnetic portion is 10 μm or more and 200 μm or less (i.e., from 0 μm to 200 μm) on each surface of the first magnetic portion on which the second magnetic portion is disposed.

Aspect 14

The coil component according to any one of aspects 1 to 13, wherein the second magnetic particles are nanocrystal particles.

Aspect 15

The coil component according to any one of aspects 1 to 13, wherein the second magnetic particles are amorphous magnetic particles.

Aspect 16

The coil component according to any one of aspects 1 to 15, wherein the second magnetic portion further contains third magnetic particles different from the second magnetic particles in the average particle diameter.

Aspect 17

The coil component according to any one of aspects 1 to 16, wherein the first magnetic portion further contains fourth magnetic particles different from the first magnetic particles in the average particle diameter.

Aspect 18

The coil component according to any one of aspects 1 to 17, wherein at least one of the first magnetic portion and the second magnetic portion contains flat-shaped magnetic particles.

The coil component according to the present disclosure has high moisture resistance and, therefore, may be used for electronic equipment and the like required to have high reliability.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a substantially rectangular parallelepiped first magnetic portion that includes a coil conductor, and the first magnetic portion contains first magnetic particles including a metal magnetic material; and a second magnetic portion disposed on at least an upper surface of the first magnetic portion, and the second magnetic portion contains second magnetic particles and a resin, wherein a resin content of the resin in the second magnetic portion is higher than a resin content in the first magnetic portion, an insulating film is disposed on a lower surface of the first magnetic portion except where an outer electrode is disposed on the lower surface of the first magnetic portion, and the insulating film contacts both the first magnetic portion and second magnetic portion on a bottom surface of the coil component.

2. The coil component according to claim 1, wherein each of the first magnetic particles has an oxide film on the surface, and the first magnetic particles are bonded to each other with the oxide film interposed therebetween.

3. The coil component according to claim 2, wherein the first magnetic portion has a multilayer structure.

4. The coil component according to claim 2, wherein each of the second magnetic particles includes a metal magnetic material.

5. The coil component according to claim 1, wherein the first magnetic portion has a multilayer structure.

6. The coil component according to claim 1, wherein each of the second magnetic particles includes a metal magnetic material.

7. The coil component according to claim 1, wherein the coil conductor includes a plurality of coil conductor layers stacked in a winding axis direction of the coil conductor, and an insulating layer is disposed between each of the plurality of coil conductor layers.

8. The coil component according to claim 7, wherein a relative magnetic permeability of the insulating layer is lower than a relative magnetic permeability of the first magnetic portion.

9. The coil component according to claim 1, wherein the second magnetic portion is disposed on the upper surface and four side surfaces adjacent to the upper surface of the first magnetic portion, and both ends of the coil conductor extend to the lower surface of the first magnetic portion.

10. The coil component according to claim 1, wherein the insulating film contains a resin.

11. The coil component according to claim 1, wherein the first magnetic portion has four side surfaces parallel to a winding axis of the coil conductor, and the coil conductor is exposed at one or more surfaces of the four side surfaces.

12. The coil component according to claim 1, wherein the first magnetic particles and the second magnetic particles differ from each other in at least one of average particle diameter and composition.

13. The coil component according to claim 1, wherein porosity of the second magnetic portion is lower than porosity of the first magnetic portion.

14. The coil component according to claim 1, wherein an average thickness of the second magnetic portion is from 10 μm to 200 μm on each surface of the first magnetic portion on which the second magnetic portion is disposed.

15. The coil component according to claim 1, wherein the second magnetic particles are nanocrystal particles.

16. The coil component according to claim 1, wherein the second magnetic particles are amorphous magnetic particles.

17. The coil component according to claim 1, wherein the second magnetic portion further contains third magnetic particles different from the second magnetic particles in average particle diameter.

18. The coil component according to claim 1, wherein the first magnetic portion further contains fourth magnetic particles different from the first magnetic particles in average particle diameter.

19. The coil component according to claim 1, wherein at least one of the first magnetic portion and the second magnetic portion contains flat-shaped magnetic particles.

* * * * *